United States Patent
Finkelstein

(12) 
(10) Patent No.: US 6,467,989 B1
(45) Date of Patent: Oct. 22, 2002

(54) ADJUSTABLE COLUMN CONNECTION

(76) Inventor: Michael Finkelstein, 304 Adams Ave., Silverton, OR (US) 97381

( * ) Notice: Subject to any disclaimer, the term of this patent is extended or adjusted under 35 U.S.C. 154(b) by 0 days.

(21) Appl. No.: 09/591,808

(22) Filed: Jun. 12, 2000

(51) Int. Cl.7 ............................. B25G 3/20; F16B 2/00
(52) U.S. Cl. ..................... 403/371; 403/307; 403/367; 403/368; 403/374.3; 403/370
(58) Field of Search ................. 403/371, 368, 403/367, 373, 374.3, 370, 307, 344; 285/232

(56) References Cited

U.S. PATENT DOCUMENTS

| | | | | |
|---|---|---|---|---|
| 1,166,408 A | * | 12/1915 | Blood ..................... 403/371 X |
| 1,781,222 A | * | 11/1930 | Fischer ....................... 285/341 |
| 2,187,880 A | * | 1/1940 | Kaysing ...................... 285/341 |
| 2,255,673 A | * | 9/1941 | McDermott ............... 285/382.7 |
| 3,009,747 A | * | 11/1961 | Pitzer ..................... 403/371 X |
| 3,344,756 A | * | 10/1967 | Kelson ...................... 248/188.1 |
| 3,424,111 A | * | 1/1969 | Maslow ....................... 248/412 |
| 3,972,547 A | * | 8/1976 | Itoya ........................... 285/341 |
| 4,159,134 A | * | 6/1979 | Shemtov ...................... 285/322 |
| 4,508,466 A | * | 4/1985 | Dennis .................... 403/342 X |
| 4,676,533 A | * | 6/1987 | Gerondale ................. 285/232 X |
| 5,002,247 A | * | 3/1991 | Dispenza et al. ............ 248/188 |
| 5,433,551 A | * | 7/1995 | Gordon ............... 403/374.4 X |
| 6,003,696 A | | 12/1999 | Hsiu-Chen |
| 6,065,407 A | * | 5/2000 | Wang ..................... 403/371 X |

FOREIGN PATENT DOCUMENTS

GB        2060803 A    *  5/1981

OTHER PUBLICATIONS

Page From Decor Cable Inovations Catalog 660 W. Randolph St Chicago, Ill 60661–2114 (Shelf Support) Above Page says Component MCS on Bottom).

* cited by examiner

Primary Examiner—Greg Binda
Assistant Examiner—Ernesto Garcia

(57) ABSTRACT

An adjustable connector that can slide along a rod or tube and can be secured from axially translating in infinite positions along the entire length of the tube. It also has the capability of attaching itself to a surface or structural element such as a shelf.

6 Claims, 6 Drawing Sheets

ADJUSTABLE COLUMN CONNECTION

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The invention is in the field of joints and connections. A particular need arose for the construction of inexpensive and easily constructed shelving. Shelving schemes that I am aware of are of the box variety with sides and backs, those that use special standards with incremental spacing that have to be attached to a wall and those with frames that are assembled with nuts and bolts. The inventor felt the need for something different and so conceived of this particular article. Many devices, some quite old (U.S. Pat. No. 2,187,880 to Kaysing 1938),(U.S. Pat. No. 4,159,134 to Shemtov 1979)and (U.S. Pat. No. 4,508,466 to Dennis 1985) have used the coupling shown in some embodiments of this invention but none to my knowledge have used it in this unique way.

BRIEF SUMMARY OF THE INVENTION

The primary objective of the current invention is to provide the means to create an adjustable support system that can utilize inexpensive, thin wall electrical tubing. The essence of the invention is a two or three-piece coupling that consists of a hollow cylindrical body, gland nut and split clamping ring or split clamping collar.

It can slide along the tube and be locked at any point without marking or piercing the tube. The connector has the capability, as well, to attach to another element such as a shelf. It's application though, is not at all limited to shelving but can be used create other types of structures.

Figure 1:
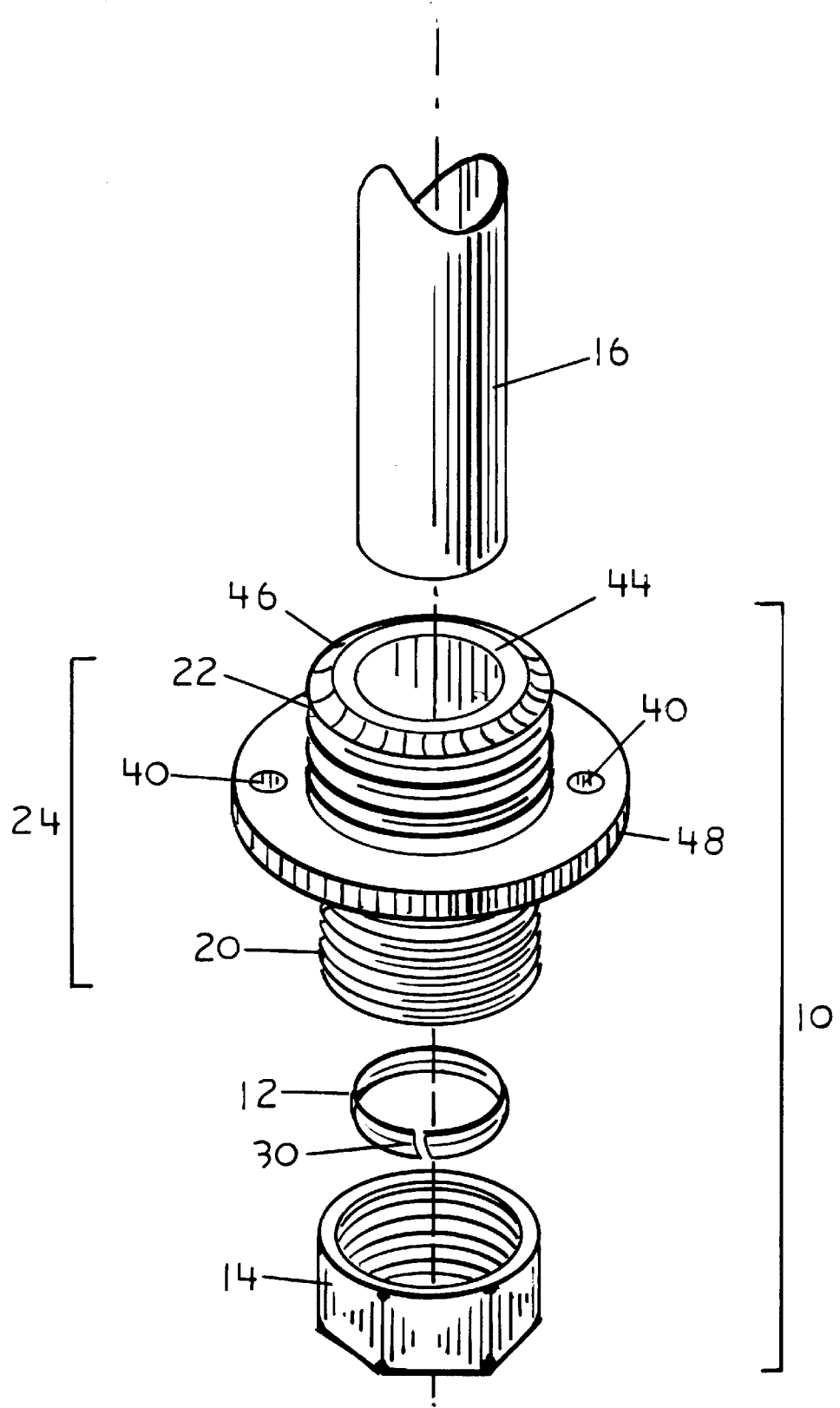
FIG. 1 shows an exploded view of the first coupling.

REFERENCE NUMERALS IN DRAWINGS 10 general designation of the first coupling
12 split annular locking ring
14 gland nut of the first coupling
16 rod or tube
18 typical mounting surface
20 barrel with machine thread
22 wood thread
24 mounting body of first coupling
26 chamfered edge on bore
28 interior space of the gland nut
30 split in clamping ring
32 general designation of the second coupling
34 holes for fasteners
36 gland nut of the second coupling
38 shoulder for centering
40 recess for spanner wrench
42 fasteners
44 bore
46 starting chamfer
48 radially extending flange of the first coupling
50 radially extending flange of the second coupling
52 typical hole in mounting surface
54 radially split clamping collar of the third coupling
56 split clamping collar cap screw

DETAILED DESCRIPTION OF THE INVENTION

Figure 2:
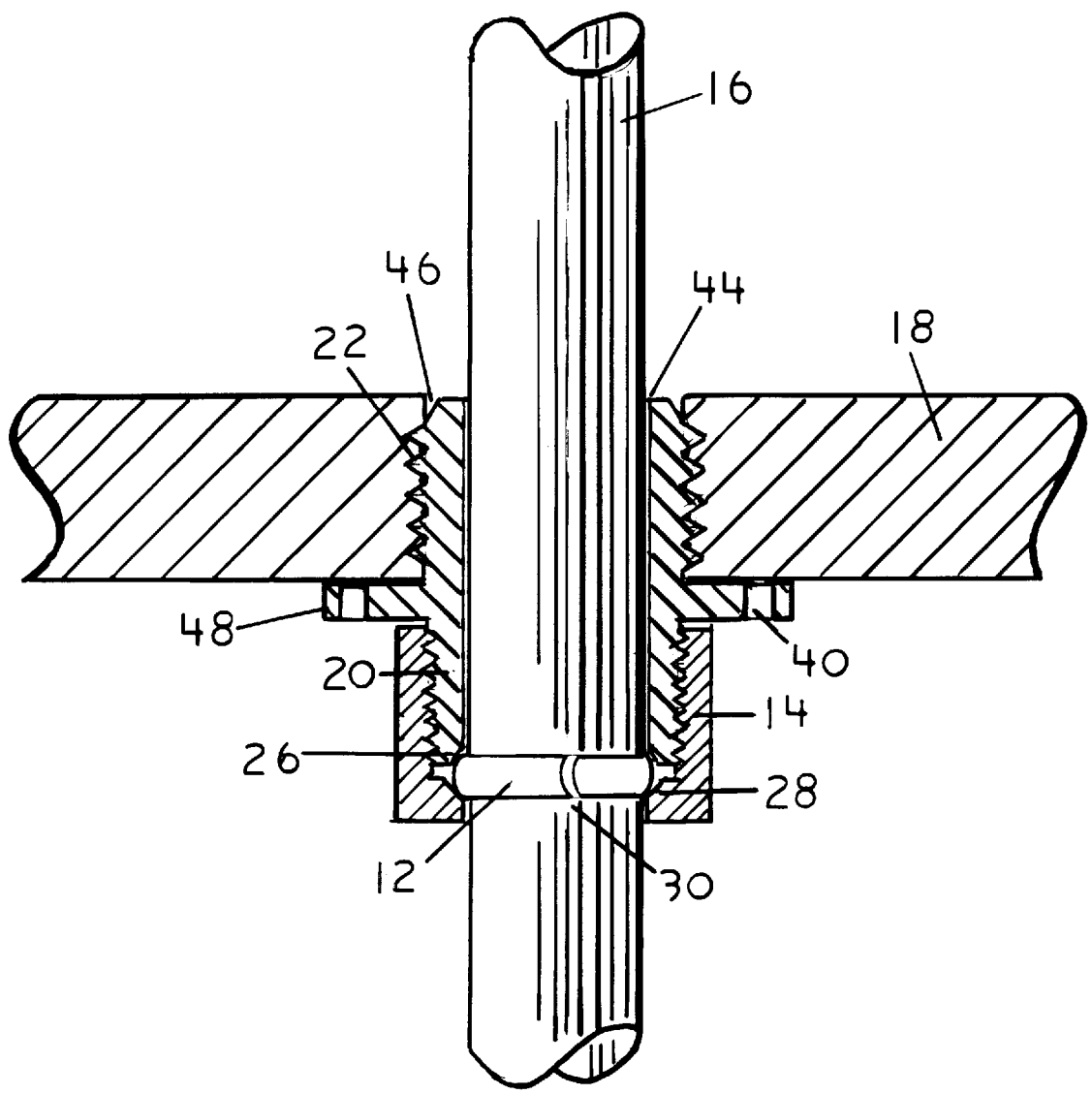
FIG. 2 shows a sectional view of the first coupling.
Figure 3:
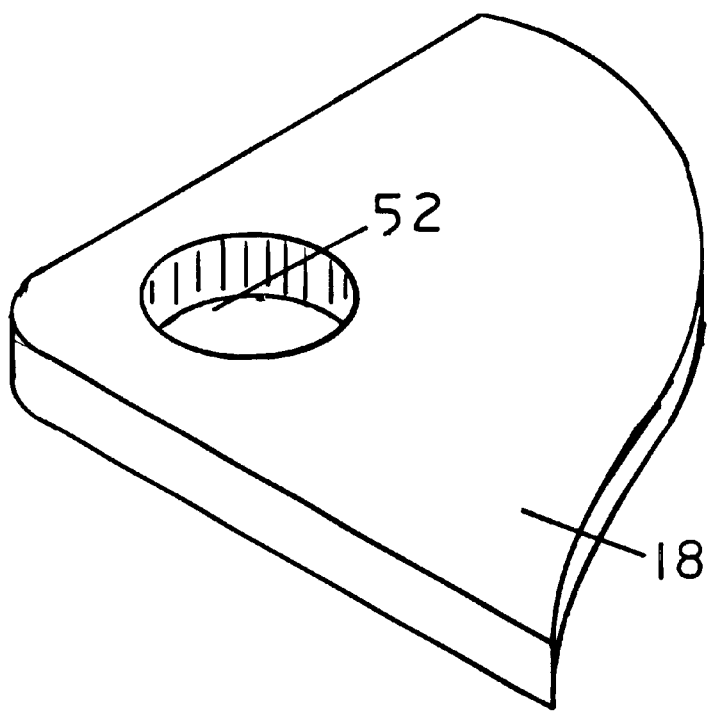
FIG. 3 shows a typical mounting hole in a generic surface.

Referring now to the drawings that illustrate the first, second and third couplings, the only essential difference between them being the way in which they attach to the mounting surface and/or clamp to the rod or tube. The reference numeral 10 designates the ensemble of the first coupling (FIGS. 1 and 2). This consists of a gland nut 14 similar to a packing gland. This nut has a inwardly facing peripheral flange with a sloping inside face that creates a relieved interior 28 to contain split annular locking ring 12, it also has six flat surfaces on the outside, enabling it to be tightened with a conventional wrench. Locking ring 12 is C shaped in cross section and split 30 to allow for expansion and contraction, the edges of the ring are sharp the better to grip the rod. Mounting body 24 is a hollow cylinder with a radially extending flange 48 about midway up the cylinder, it has a bore 44 of constant diameter that extends the entire length of the cylinder. This bore is of sufficient diameter to allow rod 16 to loosely pass completely thru. One end 20, a threaded barrel, of body 24 has machine threads to engage nut 14, the same end has a small circumferential chamfer 26 at the edge of the bore that opposes the sloped area of 14 to force the locking ring towards the rod when the nut is tightened and the annular space is compressed thus gripping the rod firmly. The other end having a wood engaging thread 22, of body 24 is constructed in such a way as to make it easy to thread into wood. This is accomplished by making the threads fairly coarse and deep with a sharp root angle. This end also has a circumferential chamfer 46, on the outside of the cylinder to aid in engaging the inside of hole 52 (FIG. 3) thru mounting surface 18. Flange 48 has two small diametrically opposed holes 40 in the annular face to accommodate a spanner wrench for the purposes of tightening the body to the mounting surface.

Figure 4:
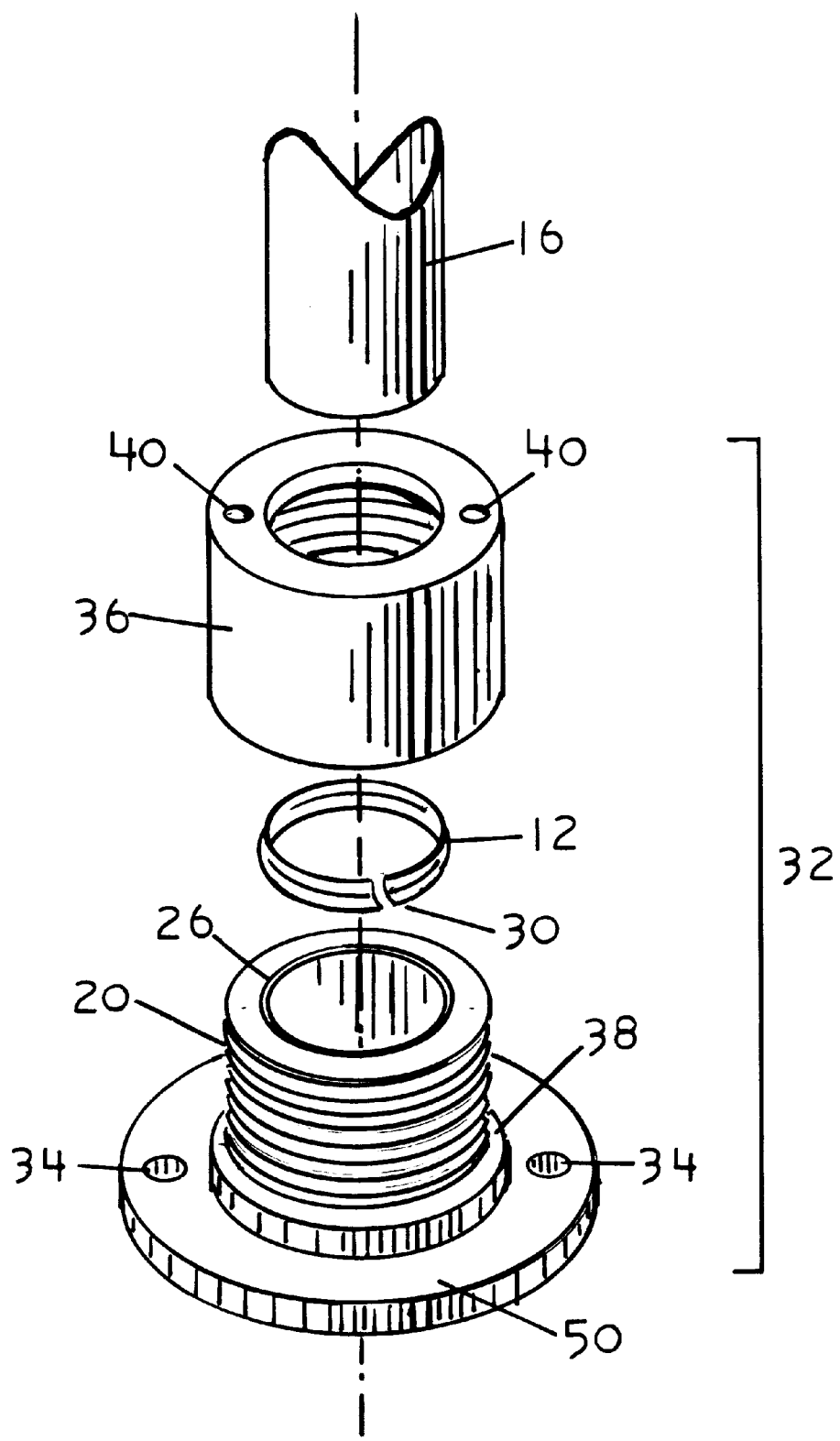
FIG. 4 shows an exploded view of the second coupling.
Figure 5:
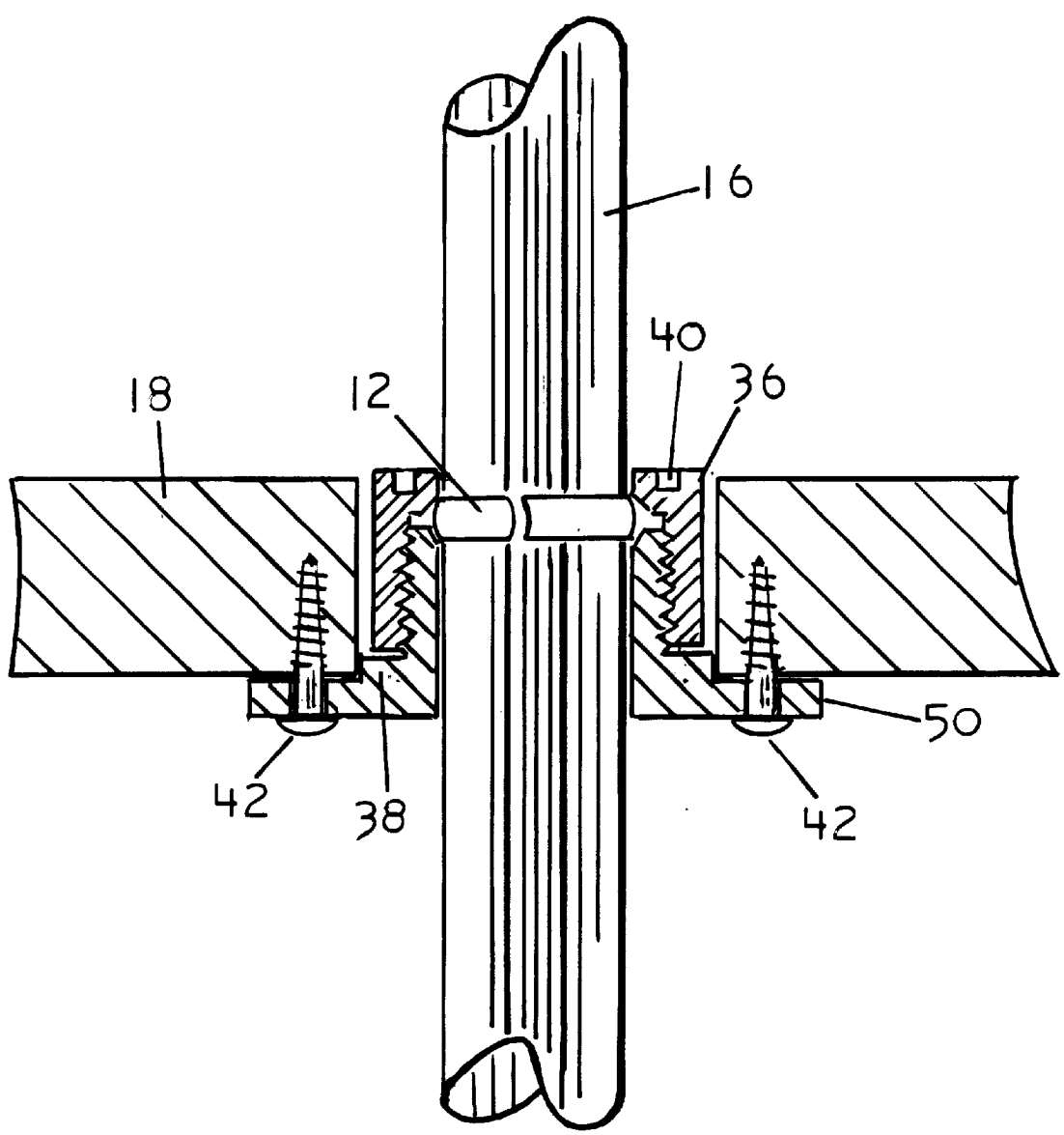
FIG. 5 shows a sectional view of the second coupling where only the mounting surface is cut away.

The second coupling 32 (FIGS. 4 and 5) differs from coupling one by the way it attaches to the mounting surface. Radially extending flange 50 has several holes 34 for fasteners 42, there is also a concentric raised shoulder 38 at the base of the threaded barrel 20 to center the connection in surface mounting hole 52. Gland nut 36 is identical to 14 in every respect except it has no hex flats on the outside, instead it has small recesses 40 for the use of a spanner wrench.

Figure 6:
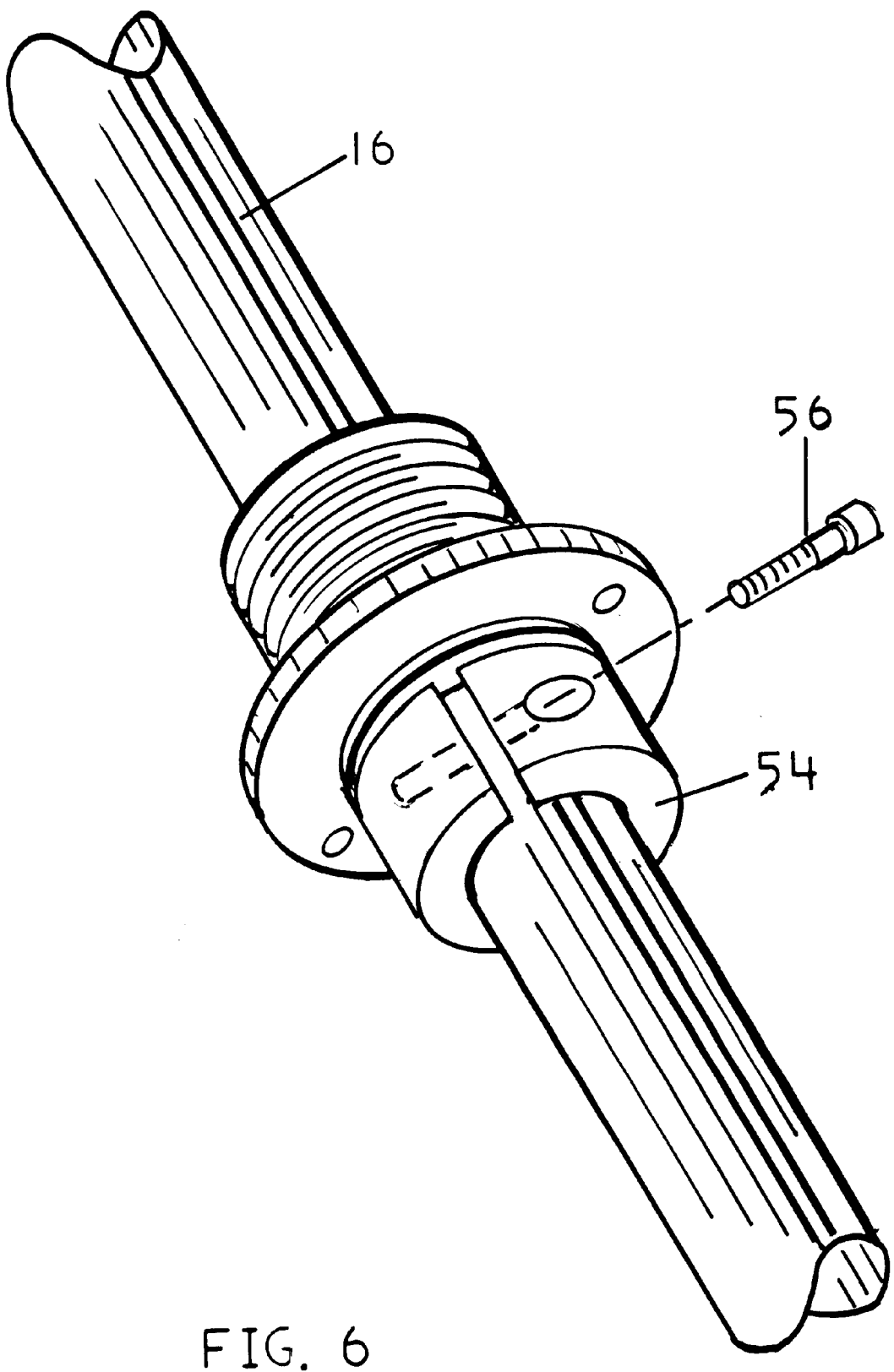
FIG. 6 shows an isometric view of the third coupling.

The third coupling shown in FIG. 6 is a variation that differs in the method of attaching to rod 16 by having a integral radially split clamping collar 54 with cap screw 56. When screw 56 is tightened the collar contracts and grasps the rod. All other aspects of coupling three are similar to one and two.

All three couplings can be manufactured from either metallic or non-metallic material. The most economical way most likely being injection molding.

Figure 7:
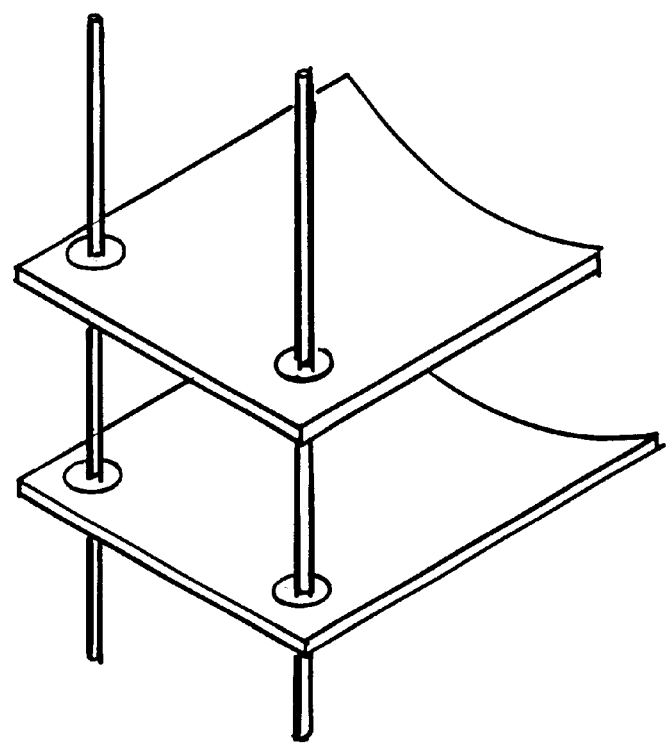
FIG. 7 shows a typical use of any coupling.

Although the above couplings imply a supported surface made of wood, a surface or element of another material can easily be adapted to. FIG. 7 gives an example of how the connection might be used in a shelving system.

It is an important object of the invention that a connection be provided that when locked offers significant resistance to axial displacement and yet can be easily unlocked and repositioned. Also, the rigidity of the connection to the surface that it is mounted on offers resistance to racking in free standing shelves.

While the couplings have been described, it is apparent that many modifications and configurations are possible without departing from the spirit of the invention.

I claim:

1. A coupling comprising:
   a gland nut having an inwardly facing peripheral flange, at one end, having a sloping, inside face; a bore extending through the entire gland nut; the bore being threaded except at the sloping, inside face;
   a locking ring;
   a mounting body comprising a hollow cylinder having a radially extending flange; wherein the radially extending flange has at least one hole; the cylinder having threads on an outside surface of the cylinder; an end of the cylinder having a circumferential chamfer at an edge of the end of the cylinder; the threaded bore matingly coupled to the threads on the outside surface of the mounting body; the locking ring being interposed between the sloping, inside face and the circumferential chamfer.

2. The coupling as claimed in claim 1, wherein the locking ring is C-shaped.

3. The coupling as claimed in claim 2, wherein the locking ring is split.

4. The coupling as claimed in claim 1, or claim 3, wherein the inwardly facing peripheral flange has at least two recesses at the end of the gland nut.

5. The coupling as claimed in claim 4, wherein the mounting body has a shoulder between the threads and the radially extending flange.

6. The coupling as claimed in claim 4, wherein the radially extending flange is located midway of the hollow cylinder.

* * * * *